United States Patent [19]

Balsells

[11] Patent Number: 5,139,243

[45] Date of Patent: Aug. 18, 1992

[54] AXIAL CANTED COIL SPRINGS IN SINUSOIDAL FORM

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 559,330

[22] Filed: Jul. 30, 1990

[51] Int. Cl.⁵ ................................................ F16F 1/06
[52] U.S. Cl. .................................. 267/167; 267/180; 267/1.5
[58] Field of Search ............... 267/166, 167, 174, 180, 267/286, 1.5, 182

[56] References Cited

U.S. PATENT DOCUMENTS

| | | | |
|---|---|---|---|
| 2,600,534 | 6/1952 | Hawkinson | 267/180 X |
| 3,468,527 | 3/1968 | Mather | 267/1.5 |
| 4,655,462 | 4/1987 | Balsells | 277/164 |
| 4,826,144 | 5/1989 | Balsells | 267/167 |
| 4,830,344 | 5/1989 | Balsells | 267/167 |
| 4,876,781 | 10/1989 | Balsells | 29/173 |
| 4,893,795 | 1/1990 | Balsells | 267/1.5 |
| 4,907,788 | 3/1990 | Balsells | 267/168 |
| 4,915,366 | 4/1990 | Balsells | 267/167 |

FOREIGN PATENT DOCUMENTS

| | | | |
|---|---|---|---|
| 566963 | 1/1953 | Fed. Rep. of Germany | 267/286 |
| 503441 | 9/1952 | France | 267/167 |

*Primary Examiner*—Matthew D. Graham
*Attorney, Agent, or Firm*—Walter A. Hackler

[57] ABSTRACT

A length of canted coil spring is disclosed which is suitable for forming a stable, when unsupported, circular axially loadable spring. The length of spring includes a plurality of elliptical coils canted along a coil centerline with the coil centerline following a helical path about a helix centerline. The length of canted coil springs is approximately equal to a distance, or pitch, along the helix centerline necessary for one complete revolution of the helical path thereabout.

12 Claims, 3 Drawing Sheets

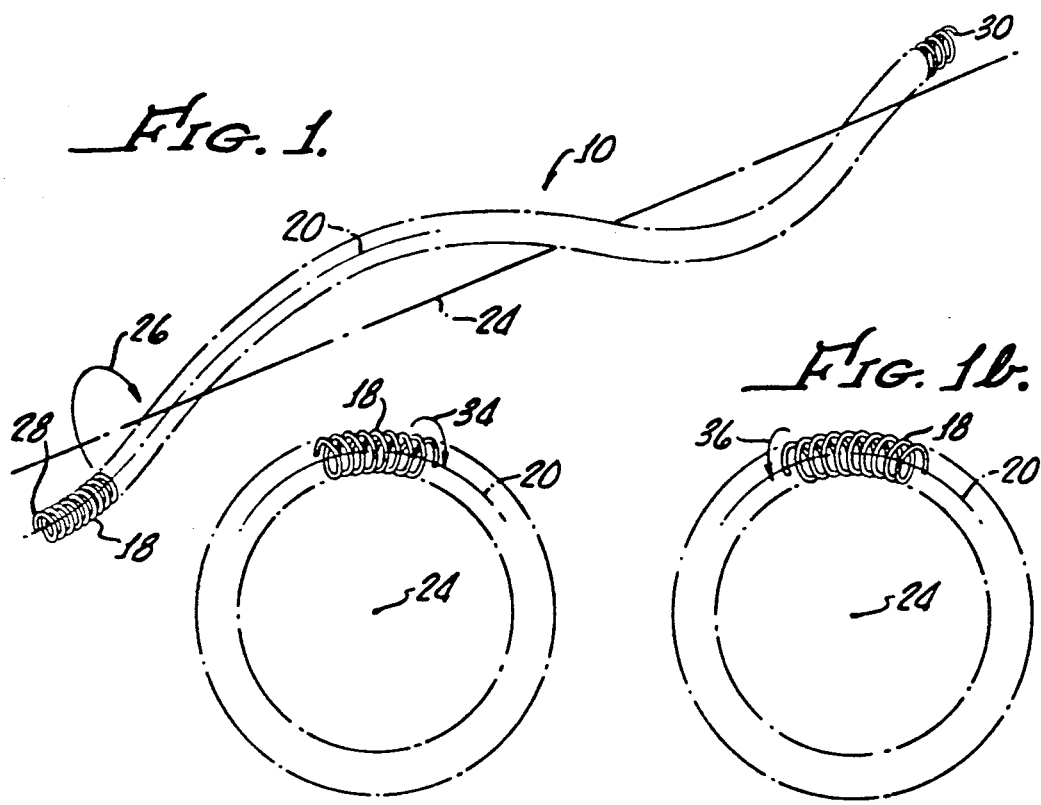
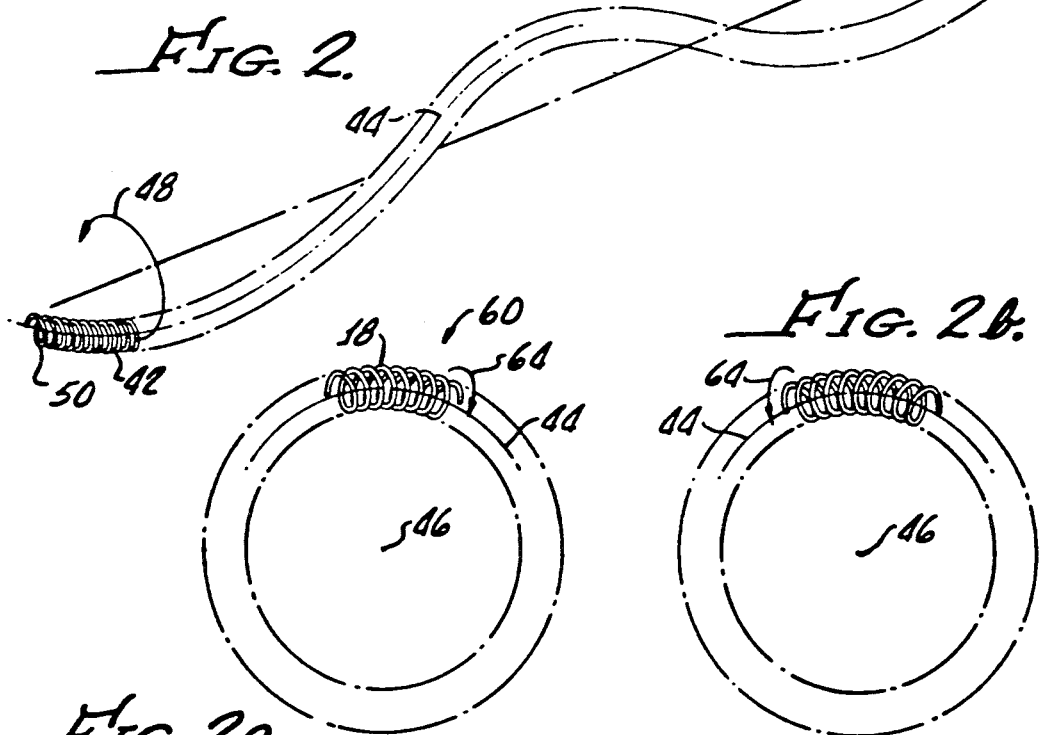

AXIAL CANTED COIL SPRINGS IN SINUSOIDAL FORM

The present invention is generally directed to a garter-type, or torroidal springs suitable for loading along a central axis thereof. More particularly, the present invention is directed to the length of canted coil springs suitable for forming a stable, when unsupported, circular axially loadable spring.

In the construction of garter-type springs, it is conventional to wind a continuous straight spring, thereafter cut the spring to a desired length and join the ends to form a continuous torris shaped spring. Springs such as disclosed in U.S. Pat. No. 3,468,527 to Mather have joined ends and form a garter-type spring suitable for radial loading, that is, in a direction perpendicular to the central axis of the garter-type spring.

The Mather reference indicates that a straight length of spring can be joined to form a spring suitable for axial loading. Contrary to this disclosure, it has been found that a straight length of spring, when joined to form a garter-type spring, will not orient the coils, which are canted to a coil centerline, in a position suitable for axially loading, without exterior support thereof Rather, the garter-type spring must be turned, or rotated, so that the coils may be axial loaded without a deformation thereof. This, however, may require complicated assembly in grooves or other support devices for holding the garter-type spring in a suitable position for axial loading.

It has been found, in accordance with the present invention, that axially loadable springs may be formed from the length of spring in which the resulting garter-type spring provides canted coils oriented for axially loading without the necessity of special grooves or devices for orienting the spring. That is, the axially loadable canted coil spring, in accordance with the present invention, is stable in and of itself. This feature provides the advantages of easy assembly and elimination of devices heretofore necessary to enable a spring made from a continuous wire to be suitable for axial loading while unsupported.

SUMMARY OF THE INVENTION

In accordance with the present invention, a length of canted coil spring suitable for forming a stable, when unsupported, circular axially loadable spring, includes a plurality of elliptical coils canted along a coil centerline with the coil centerline following a helical path about a helix centerline. In accordance with the present invention, the length of the canted coil spring is approximately equal to a distance, or pitch, along the helix centerline necessary for one complete revolution of the helical path thereabout.

In other words, means are provided, which define a length of spring, for enabling a length of canted coil spring to be formed into a circular axial spring having a major axis of the elliptical coils being approximately in the plane of the circular axially loadable spring. In addition, means defining a coil height, measured along a minor axis of each elliptical coil, and a coil wire thickness is provided for causing the stable circular axially loadable spring to assume a selected turn angle when the length of spring is joined to form the circular axially loadable spring.

In addition, means may be provided which define a canted coil spring amplitude, measured perpendicular to the helix centerline between points of maximum traverse of the helical path from the helical centerline, for causing the stable circular axially loadable spring to assume a preselected turn angle when the length of canted coil spring is joined to form the circular axially loadable spring.

A number of configurations, combinations, are available in accordance with the present invention. In one embodiment, the helical path advances in a clockwise manner along the helix centerline and the elliptical coils are wound in a clockwise manner about the coil centerline Alternatively, the helical path may advance in a clockwise manner along the helical centerline and the elliptical coils may be wound in a counterclockwise manner about the coil centerline.

Other embodiments include a spring having a helical path advancing in a counter clockwise manner along the helical centerline and the elliptical coils being wound in a clockwise manner about the coil centerline and, in a last embodiment, the helical path may advance in a counterclockwise manner along the helix centerline and the elliptical coils may be wound in a counterclockwise manner about the coil centerline.

Still more particularly, the spring in accordance with the present invention may have a length equal to within plus or minus 50 percent of the pitch, or in some instances, preferably plus or minus 10 percent of the pitch or more preferably, plus or minus 10 percent of the pitch.

BRIEF DESCRIPTION OF THE DRAWINGS

The advantages and features of the present invention will appear from the following description when considered in conjunction with the accompanying drawings in which:

FIG. 1 is a perspective view of one embodiment (hereinafter designated "RF") in accordance with the present invention, showing a length of canted coil springs in which a plurality of elliptical coils have a coil centerline following a helical path in a clockwise manner about a helical centerline and the elliptical coils are wound in a clockwise manner about the coil centerline;

FIG. 1a is a plan view of the spring length of FIG. 1 with ends joined to form a stable axially loadable garter-type spring;

FIG. 1b is a plan view of another embodiment of the present invention in which the coil centerline following a clockwise helical path as shown in FIG. 1, but the coils are wound in a counterclockwise direction about the coil centerline (hereinafter designated "RF-RF");

FIG. 2 is a perspective view of another embodiment (hereinafter designated "F") in accordance with the present invention, showing a length of canted coil springs in which a plurality of elliptical coils have coil centerline following a helical path in a counterclockwise manner about a helical centerline and the elliptical coils are wound in a clockwise manner about the coil centerline;

FIG. 2a is a plan view of the spring length of FIG. 2 with ends joined to form a stable axially loadable garter-type spring;

FIG. 2b is a plan view of another embodiment of the present invention in which the coil centerline follows a counterclockwise helical path as shown in FIG. 2, but the coils are wound in a counterclockwise direction about the coil centerline (hereinafter designated "F—F");

DETAILED DESCRIPTION

Figure 3:
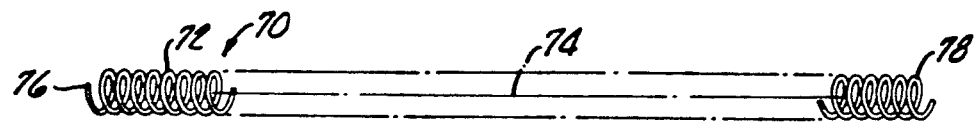
FIG. 3 is a prior art length of spring suitable for forming a stable radial garter-type spring, but not a stable unsupported axially loadable garter-type spring.

Turning now to FIGS. 1 through 2b there is shown springs 10, 12, 14, 16, in accordance with the present invention in four different embodiments. This can be seen from FIG. 1 and 1a, spring 10, hereinafter indicated as an "RF" series, includes a plurality of elliptical coils 18 canted along a coil centerline 20, with the coil centerline 20 following a helical path about a helix centerline 24.

As shown in FIG. 1a, the ends 28, 30 of the spring 10 are interconnected to form a garter-type spring 32, in which the coils 18 are wound in a clockwise direction about the coil centerline 20 as indicated by the arrow 34.

Alternatively, as shown in FIG. 1b, the coils 18 may be wound in a counterclockwise direction about the centerline 20 as shown by the arrow 36. This latter configuration being identified as "R"—"RF" series.

Turning to FIG. 2, there is shown a length of spring 40 in which the plurality of elliptical coils 42 are canted along a coil centerline 44 which follows a helical path about a helical centerline 46 in a counterclockwise direction as indicated by arrow 48. As shown in FIG. 2a, when ends 50, 52 of the spring length 40 are interconnected to form a garter-type spring 60, the coils 18 may be wound in a clockwise direction as shown by the arrow 62, in which case the spring is indicated as a series "F" spring, or, alternatively, as shown in FIG. 2b, if the coils 18 are wound in a counterclockwise direction (arrow 64) around the centerline 44, the spring is a "F—F" series spring.

These springs should be contrasted with those of the art, shown in FIG. 3 in which a length of the spring 70 therein is linear, and the coils 72 follow a straight coil axis 74 before ends 76, 78 are attached to form a garter-type spring.

Figure 4A:
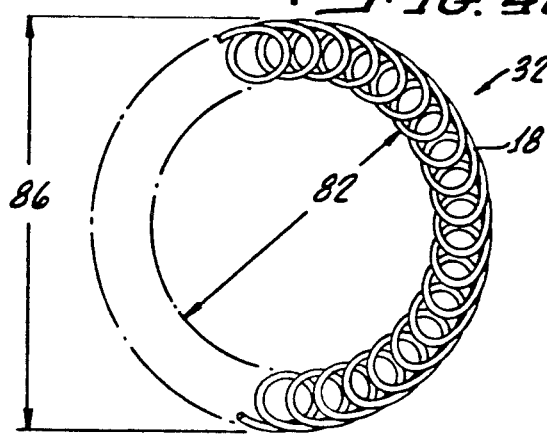
FIG. 4a and 4b are a top and side view of an "RF" spring showing the clockwise canting of coils and front and back angles.
Figure 4B:
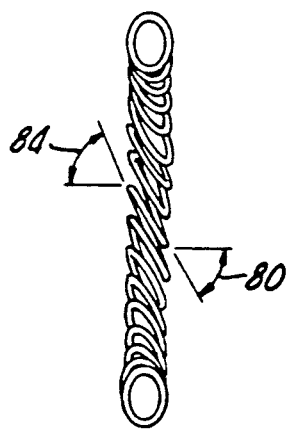

As hereinbefore indicated it has been discovered that this type of spring is incapable of forming a stable garter-type spring suitable for axially loading FIG. 4a and b are a plan view and cross-section view of the garter spring 32 showing in the "R" series, coils 18 canting clockwise with a back angle 80 on an inside diameter 82 of the spring 32 and the front angle 84 on an outside diameter 86 of the coil 32. A more detailed description of the back angle and its relationship in garter-type springs may be found in U.S. Pat. No. 4,826,144 and 4,915,366 entitled: "Inside Back Angle Canted Coil Spring" and "Outside Back Angle Canted Coil Spring", respectively. Incorporation of these patents into the present application is specifically made in order to more clearly describe the nature and importance of the back angle in garter-type springs. Since the back angle is clearly described in these patents, no detailed discussion thereof is presented herein.

Figure 5A:
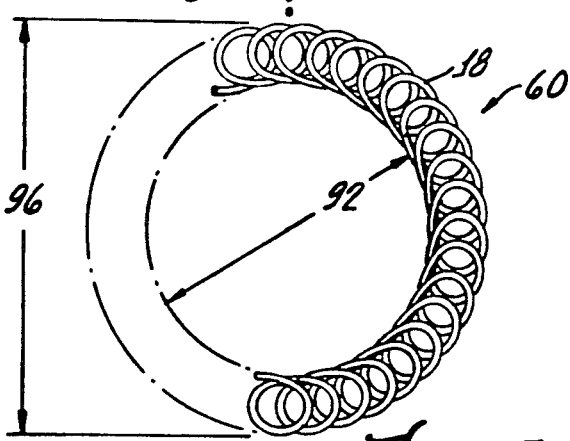
FIG. 5a and 5b are a plan and side view of an "F"-type coil showing counterclockwise canted coils and the relative front and back angles.
Figure 5B:
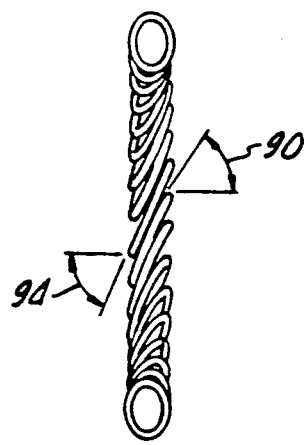

Turning to FIG. 5a and 5b, there is shown a garter-type spring 60, series "F", counterclockwise canting of coils 18 with a back angle 90 along an outside diameter 92 of the spring 60 and a front angle 94 disposed along the inside diameter 96 of the spring 60.

Figure 6:
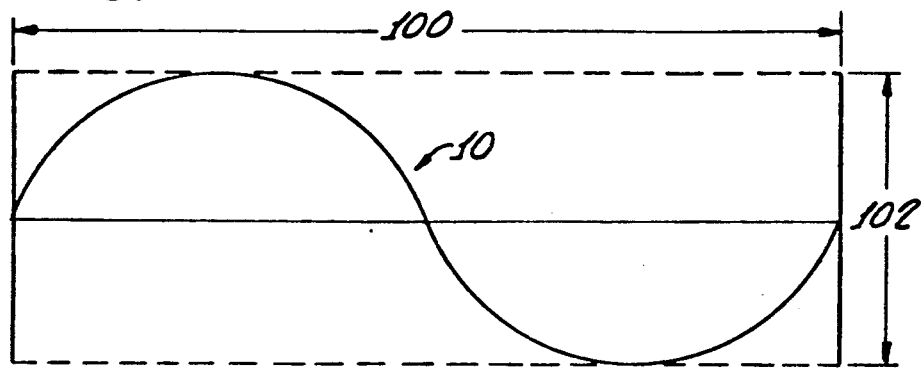
FIG. 6 and 6a are diagrammatic views of springs in accordance with the present invention showing variations of pitch and amplitude.
Figure 6A:
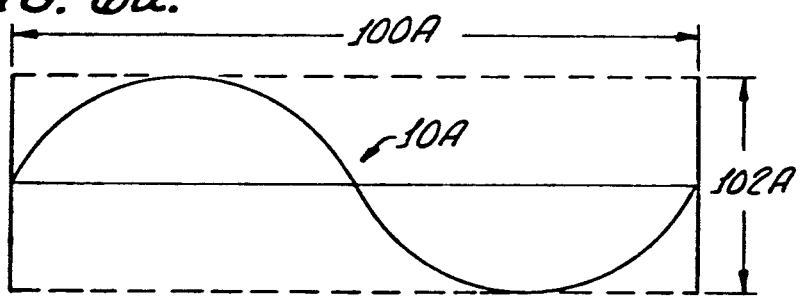

In FIGS. 6 and 6a, there is shown, in diagrammatic form, a spring 10 and 10a having a pitch 100 to amplitude 102 ratio of 3.2. In FIG. 6, the ratio is 4.95 inches to 1.54 inches, showing a maximum pitch and in FIG. 6a, the spring 10a has a pitch 100a to amplitude 102a ratio of 4.0 to 5 inches/1.26 inches or 3.2 which represents a minimum pitch for a series of springs to have a circular inside diameter between from about 0.05 to about 1.75 inches in which the spring 100, 100a will exhibit a turn angle with $\theta$ (see FIG. 7), which will vary from 0 degrees to approximately 45 degrees.

Actual parameters for a series of springs are shown in Table 1 with the characteristics stated therein identified in FIG. 7 in which, as hereinabove mentioned $\theta$ is the turn angle, d, is the wire diameter CW is the coil width, CH is the coil height, H is the height. It should be appreciated that the actual length, L, as shown in Table 1, corresponds to the spring 10, or 10a, in a linear configuration.

Figure 8:
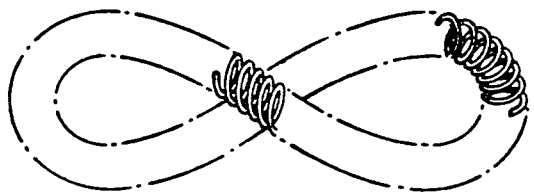
FIG. 8 is a drawing of an unstable figure eight position by a helical length of spring having a length 2× greater than the pitch length.

It should be appreciated that when the length of spring 10 or 10a is cut at a length about 2× greater than the pitch length, the resulting spring 120 shown in FIG. 8 assumes unstable Figure-eight shaped configuration. That is, it will not maintain a garter-type configuration enabling its coils to be oriented for axial loading.

TABLE 1

| Inside Dia. (inches) | Dimension H | | Turn Angle $\theta$ | | CH Coil Height | CW Coil Width |
|---|---|---|---|---|---|---|
| | Spring No. 1 | Spring No. 2 | Spring No. 1 | Spring No. 2 | | |
| 0.50 | .1680 in. | .1675 in. | 32° | 30° | .163 | .179 |
| 0.75 | .1660 in. | .1675 in. | 23° | 30° | .163 | .179 |
| 1.25 | .1675 in. | .1680 in. | 30° | 32° | .163 | .179 |
| 1.75 | .1682 in. | .1675 in. | 32° | 31° | .163 | .179 |
| Inside Dia. Less than (.500) at (.250) In. | | | | | | |
| 0.25 | .1709 in. | .1667 | 43° | 40° | .163 | .179 |

L = Actual length, pitch = 405/4.95, Amplitude = 1.26/1.54 = 3.925 Max.
d = Wire Dia. = .022
Back Angle = 14 degrees
D = CH/d = 7.36

In accordance with the present invention, the spring length may be within plus or minus 50 percent of the pitch, preferably plus or minus 30 percent of the pitch and more preferably plus or minus 10 percent of the pitch.

Figure 7:
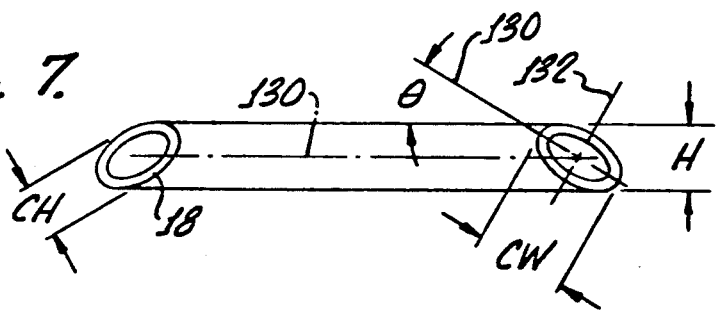
FIG. 7 is a diagram showing the characteristics of a garter-type spring in accordance with the present invention showing various parameters thereof.

As shown diagrammatically in FIG. 7, the coils 18 have a major axis 130 and a minor axis 132 and as can be appreciated, when the turn angle is 0, the major axis 130 will fall into the plan of the circular axially loadable spring.

Table 2 shows additional spring parameters in which a CH/d ratio of 10.9 results in a turn angle of 6 to 7 degrees and a CH/d ratio of 5.6 results in a 40 to 42 degree turn angle.

It should be appreciated that these springs 10, 40, in accordance with the present invention, may have turn angles thereof from 0 to about 45 degrees and under these conditions, when the spring 10, 40 is joined to form circular springs 32, 60, the spring may be rotated 180 degrees and maintain a stable position. The direction of the coils will not change, that is, if it was clockwise in one position, it would still be clockwise by turning it 180 degrees.

Review of the parameters shown in Tables 1 and 2 it can be noted that the characteristics of the spring can be determined by the spring diameter, pitch length, etc. These characteristics are interrelated and it should be appreciated that as the spring cross-section of coil height increases and the spring diameter increases, the pitch length will also increase.

It is also important to note that as the length of the spring increases and is greater than the pitch length, the spring, when made in the form of circle, will tend to twist and form the eight position. If the spring length is, for example, 2× the pitch, it will assume a Figure-eight position.

TABLE 2

| Inside Dia. (inches) | Dimension H | | Turn Angle θ | | CH Coil Height | CW Coil Width |
|---|---|---|---|---|---|---|
| | Spring No. 1 | Spring No. 2 | Spring No. 1 | Spring No. 2 | | |
| Axial Series RF 106 LB (1.250)-2 | | | | | | |
| 1.250 | .1635 | .1639 | 6° | 7° | .163 | .182 |

L = Actual length, pitch = 4.05/4.95, Amplitude = 1.26/1.54 = 3.925
d = Wire Dia. = .016
Back Angle = 18 degrees
D = D/d = 10.19

| Axial Series RF 106 HB (1.250-2) | | | | | | |
|---|---|---|---|---|---|---|
| 1.250 | .170 | .169 | 42° | 40° | .159 | .176 |

L = Actual length, pitch = 4.05/4.95, Amplitude = 1.26/1.54 = 3.925
d = Wire Dia. = .028
Back Angle = 9 degrees
D = CH/d = 5.68

When the length of the spring decreases and is smaller than the pitch length, when making a circular spring, the turn angle will increase.

It is also important to note that other variables such as the back angle, hereinabove discussed, has important implications in the overall spring performance as discussed in the hereinabove referenced U.S. patent.

In summary, the turn angle of the springs made in accordance with the present invention, will vary primarily on the CH/d ratio and the height of the amplitude of the centerline helical path. Generally, a spring that has a large CH/d ratio has a smaller turn angle and the spring that has a small CH/d ratio has a large turn angle. For example, springs that have a CH/d ratio between 8½ to 12 will have a small turn angle, generally between 0 and 10 degrees. Springs that have a turn angle from about 10 degrees to 35 degrees will have a CH/d ratio which will vary to about 6½ to about 8½ and springs that have a turn angle greater than 35 degrees will have a CH/d ratio of smaller than 6½.

Although there has been described hereinabove a specific length of canted coil springs suitable for forming a stable, when unsupported, circular axially loadable spring, for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A length of canted coil spring suitable for forming a stable, when unsupported, circular axially loadable garter-type spring, said length of canted coil spring comprising:

a plurality of elliptical coils canted along a coil centerline, said coil centerline following a helical path about a helix centerline when the length of canted coil spring is in an unrestrained, non-circular form, said length of canted coil spring being approximately equal to a pitch along the helix centerline necessary for one complete revolution of the helical path thereabout.

2. A length of canted coil spring suitable for forming a stable, when unsupported, circular axially loadable garter-type spring, said canted coil spring comprising:

a plurality of elliptical coils canted along a coil centerline, said coil centerline following a helical path about a helix centerline when the length of canted coil spring is in an unrestrained, non-circular form, and means, defining a length of said canted coil spring, for enabling the length of said canted coil spring to be formed into a circular axial garter-type spring having a major axis of the elliptical coils being approximately in the plane of the circular axially loadable spring.

3. A length of canted coil spring suitable for forming a stable, when unsupported circular axially loadable garter-type spring, said length of canted coil spring comprising:

a plurality of elliptical coils canted along a coil centerline, said coil centerline following a helical path about a helix centerline when the length of canted coil spring is in an unrestrained, non-circular form;

means defining a coil height, measured along a minor axis of each elliptical coils, and a coil wire thickness, for causing the stable circular axially loadable garter-type spring to assume a selected turn angle when the length of canted coil springs is joined to form the circular axially loadable garter-type spring; and said length of canted coil spring being approximately equal to a pitch along the helix centerline necessary for one complete revolution of the helical path thereabout.

4. The canted coil spring according to claim 1, 2 or 3 further comprising means defining a canted coil spring amplitude, measured perpendicular to said helix centerline between points of maximum traverse of the helical path from the helix centerline, for causing the stable circular axially loadable spring to assume a selected turn angle when the length of canted coil spring is joined to form the circular axially loadable spring.

5. The canted coil spring according to claim 1, 2 or 3 wherein the helical path advances in a clockwise manner along the helix centerline and the elliptical coils are wound in a clockwise manner about said coil centerline.

6. The canted coil spring according to claim 1, 2 or 3 wherein the helical path advances in a clockwise manner along the helix centerline and the elliptical coils are wound in a counterclockwise manner about said coil centerline.

7. The canted coil spring according to claim 1, 2 or 3 wherein the helical path advances in a counterclockwise manner along the helix centerline and the elliptical coils are wound in a clockwise manner about said coil centerline.

8. The canted coil spring according to claim 1, 2 or 3 wherein the helical path advances in a counterclockwise manner along the helix centerline and the elliptical coils are wound in a counterclockwise manner about said coil centerline.

9. The canted coil spring according to claim 1 wherein said length of canted coil spring is within ±10 percent of the pitch.

10. The canted coil spring according to claim 1 wherein said length of canted coil spring is within ±50 percent of the pitch.

11. The canted coil spring according to claim 1 wherein said length of canted coil spring is within ±30 percent of the pitch.

12. A length of canted coil spring suitable for forming a plurality of stable, when unsupported, circular axially loadable garter-type springs, said length of canted coil spring comprising:

a plurality of elliptical coils canted along a coil centerline, said coil centerline following a helical path about a helix centerline, when the length of canted coil spring is in an unrestrained, non-circular form, said length of canted coil spring being approximately equal to a multiple of a distance along the helix centerline necessary for one complete revolution of the helical path thereabout.

* * * * *